UNITED STATES PATENT OFFICE.

MONE R. ISAACS, OF PHILADELPHIA, PENNSYLVANIA, ASSIGNOR TO UNITED PRODUCTS CORPORATION OF AMERICA, OF PHILADELPHIA, PENNSYLVANIA, A CORPORATION OF DELAWARE.

COATING COMPOSITION OR PAINT.

1,424,908.   Specification of Letters Patent.   Patented Aug. 8, 1922.

No Drawing.   Application filed July 30, 1919. Serial No. 314,363.

*To all whom it may concern:*

Be it known that I, MONE R. ISAACS, a citizen of the United States, and a resident of the city of Philadelphia, county of Philadelphia, and State of Pennsylvania, have invented certain new and useful Improvements in Coating Compositions or Paints, of which the following is a full, clear, and complete disclosure.

My invention relates to a composition of matter adapted for use as a coating substance or paint or the like and preferably relates to that class of coating compositions or paints which are soluble in water or in an alkaline solution and which are generally known under the name of "water paints."

An object of my invention is to produce such compositions from a proteinous, albuminous, gelatinous or similar substances or a mixture of materials or ingredients including such substances as an essential part thereof and I preferably produce the same from a proteid or a mixture of proteids, such as albumins, albuminoids and casein or compositions containing the same as an essential element thereof, such as casein glues, casein sizings, and similar materials.

Another object of my invention is to produce such compositions, with certain ingredients or chemicals, which will be adapted to be applied as a coating, paint or the like to any adaptable surface, such as, plaster, concrete, cement, stone, bricks, wood, metal, cloth, fabrics, hides, leather, skins, paper, glass, compositions and other and similar substances or objects.

A further object of my invention is to produce a composition of the character aforesaid which will also possess, in an unusually high degree, the quality or property of resisting the effects of the weather or climate, making the same water proof, also of high and cold temperatures, as may result from the action of the sun, fires, frost and freezing conditions, physical and chemical effects, as may arise from the action of fumes, vapors, gases and the like and of dampness, moisture, humidity, water and the like.

A still further object of my invention is to provide a composition possessing, in addition to the above mentioned characteristics, the property of being very adherent, flexible, durable, sanitary, germ and insect proof and the like.

A still further object of my invention is to produce a composition of the character aforesaid and which will also possess preservative and germ or insect repellent properties, as well as other characteristics, such as a deep tone or color, increased binding power and excellent weather-proofing properties.

Other and further objects of my invention will be more fully disclosed in the following specification.

I have discovered that by combining with a proteid or a mixture of proteids, and more particularly casein or compounds containing casein as an essential element thereof, certain proportions of an alkaline earth compound, such as lime, and a soluble fluoride or soluble compounds containing fluorine, with or without a compound or compounds of the alkaline earth chemical group, such as, calcium and magnesium, and more particularly plaster of Paris, clay, cement and "Asbestine," or compounds containing the silicates and aluminates of calcium and magnesium, such as for example, clay, cements and Portland cement, that a coating composition is obtained which possesses the characteristics, hereinbefore enumerated, particularly suited for use as a "water" paint.

In carrying my invention into practice I preferably mix a proteid, a proteinous substance, or an albuminoid, such as casein, or compounds containing casein casein glue, or compounds containing casein as an essential element thereof with an alkaline earth compound, such as lime, and a soluble fluoride or a soluble compound containing fluorine. To this I add, depending upon the particular use to which the coating composition or paint is to be put or the particular surface or object to be treated, certain filling, carrying and binding ingredients, such as compounds containing calcium and magnesium, compounds containing the silicates and aluminates of calcium and magnesium, plaster of Paris, "Asbestine," argillaceous materials such as clay, cements, particularly Portland cement and various coloring materials, preferably mineral colors.

In compounding or producing such compositions, I do not wish to limit myself, except as herein otherwise indicated, in the particular amounts or number of the ingredients entering therein since the surfaces to which the composition is to be applied as well as the conditions to which the composition is to be subjected, require different proportions of the various ingredients and substances constituting the composition, to secure the best results for the purpose intended.

I find that such composition may be suitably produced by mixing in the proportion by weight from five (5) to twenty (20) parts of casein, from five (5) to sixty (60) parts of lime, from one half ($\frac{1}{2}$) to five (5) parts of a fluoride or a compound containing fluorine, preferably sodium fluoride, from one half ($\frac{1}{2}$) to ten (10) parts of a silicate, preferably sodium silicate and from twenty (20) to eighty (80) parts of any one or a mixture of any of the following ingredients; "Asbestine," plaster of Paris, clay, cement, Portland cement, Rosendale cement, or other compounds of calcium or magnesium, or compounds of the silicates and aluminates of calcium and magnesium, and from a minute to a large portion of coloring matter, depending upon the shade or tint of the color desired. In adding coloring matter a certain relation of the proportions between the same and the plaster of Paris and "Asbestine" is maintained, in that, when more or less coloring matter is added, proportionately less or more plaster of Paris and "Asbestine" respectively is included in the composition. To the above mixture I then add an equal amount of water and permit the mass to stand for about fifteen (15) minutes prior to using the same as a coating composition or a paint.

I have discovered, however, that when the composition is used upon a metal or similar surface better results are obtained by decreasing the sodium silicate ingredient, while on the other hand, if the same be used as an "inside" paint I have found that the inclusion of only "Asbestine" as a filler will give very goods results, and that for use as an "outside" paint a larger portion of plaster of Paris is necessary to produce good results.

More particularly, for a composition for general use or adaptation, such as for coating or painting wood, fabrics, cloth, cement, plaster and the like, I mix the component substances in the proportions by weight of fifteen (15) parts of casein, twenty (20) parts of lime, three (3) parts of a fluoride, preferably sodium fluoride, one (1) part of sodium silicate, ten (10) parts of "Asbestine," fifty (50) parts of plaster of Paris, and twenty (20) parts of coloring matter, preferably a mineral color and an equal amount of water.

I have found, however, that a very efficient and efficacious composition including a large portion of Portland cement may be produced, in the proportions by weight of fifteen (15) parts of casein, twenty (20) parts of lime, three (3) parts of sodium fluoride, one (1) part of sodium silicate, fifty (50) parts of Portland cement, thirty (30) parts of coloring matter and an equal amount of water.

Of these formulae, for certain purposes, as for coating metal and the like, the sodium silicate constituent may be omitted.

In the above it will be observed that the lime is included in a preferably large proportion, the reason for this being for the same to act as a solvent for the proteids, the albuminoids or the casein and yet to leave a sufficient quantity thereof to insure a complete chemical reaction between the same and the other chemicals entering into the composition. Moreover, in the case of coating or painting cements, plaster, stone, bricks and the like the lime also further acts as a binder between the ingredients of the coating composition and the material of the objects coated.

I have further discovered that by adding, to any of the above mentioned compositions, from one half ($\frac{1}{2}$) to five (5) parts by weight of naphthalene that the "keeping" property of the coating composition or paint is improved and also that the addition of the naphthalene has a tendency to prevent germs, moths and the like from attacking or adhering to such composition or any surface coated thereby.

I have also discovered that by adding from five (5) to twenty (20) parts by weight of an oil, such as a mineral or paraffine oil, a coal-tar oil, a vegetable oil or an animal oil and the like or both the composition will be given a deeper color, and better water-proofing properties.

The naphthylic ingredient and the oil may be added either at the time when preparing or mixing the ingredients to form the aforesaid composition or at the time when the said composition is used to coat or paint any of the objects or articles herein mentioned.

While I have described the manner in which my coating composition or paint may be produced, these descriptions are intended as exemplifying rather than limiting my invention and it is to be understood that the materials, their proportions, the number enumerated, and the mode of treatment may be suitably varied without departing from the spirit of my invention and the scope of the appended claims.

Having thus described my invention what

I claim and desire to secure by Letters Patent is:

1. A composition of matter adapted for use as a coating composition or a paint, comprising a proteinous substance, an alkali earth hydroxid, a soluble fluoride, and binding and filling material.

2. A composition of matter adapted for use as a coating composition or paint, comprising casein, an alkali, a soluble fluoride, and binding and filling material.

3. A composition of matter adapted for use as a coating composition or paint, comprising casein, lime, sodium fluoride, and binding and filling material.

4. A composition of matter adapted for use as a coating composition or paint, comprising casein, an alkali, a soluble fluoride, and filling and binding material, comprising inorganic cement.

5. A composition of matter adapted for use as a coating composition or paint, comprising casein, an alkali, a soluble fluoride, and filling and binding material, comprising plaster of Paris.

6. A composition of matter adapted for use as a coating composition or paint, comprising casein, an alkali, a soluble fluoride, and filling and binding material, comprising plaster of Paris and Portland cement.

7. A composition of matter adapted for use as a coating composition or paint, comprising a proteinous substance, an alkali, a soluble fluoride, and filling and binding material, comprising inorganic cement and inert earthy filling and coloring material.

8. A composition of matter adapted for use as a coating composition or paint, comprising a proteinous substance, an alkali, a soluble fluoride, a naphthylic preserving material, and binding and filling material, comprising inorganic cement, and inert filling and coloring material.

9. A composition of matter adapted for use as a coating composition or paint, comprising a proteinous substance, an alkali, a soluble fluoride, a naphthylic preserving material, an oil, and binding and filling material, comprising inorganic cement, and inert filling and coloring material.

10. A composition of matter adapted for use as a coating composition or paint, comprising casein, lime, a soluble fluoride, and filling and binding material, comprising inorganic cement and calcium carbonate.

11. A composition of matter adapted for use as a coating composition or paint, comprising casein, an alkali, soluble fluoride, and filling and binding material, comprising inorganic cement, calcium carbonate and clay.

12. A composition of matter adapted for use as a coating composition or paint, comprising casein, lime, sodium fluoride, and filling and binding material, comprising inorganic cement, calcium carbonate, clay and coloring matter.

13. A composition of matter adapted for use as a coating composition or paint, comprising casein five (5) to twenty (20) parts, lime five (5) to sixty (60) parts, sodium fluoride one-half (½) to five (5) parts, and filling and binding material twenty (20) to eighty (80) parts.

14. A composition of matter adapted for use as a coating composition or paint, comprising casein substantially fifteen (15) parts, lime substantially twenty (20) parts, sodium fluoride substantially three (3) parts, and filling and binding material substantially eighty (80) parts.

15. A composition of matter adapted for use as a coating composition or paint, comprising casein substantially fifteen (15) parts, lime substantially twenty (20) parts, sodium fluoride substantially three (3) parts, and filling and binding material, comprising an inorganic cement, substantially fifty (50) parts, and inert earthy filling and coloring material substantially thirty (30) parts.

In witness whereof, I have hereunto set my hand this 28th day of July, 1919.

MONE R. ISAACS.